United States Patent
Leung et al.

(10) Patent No.: US 7,104,185 B2
(45) Date of Patent: Sep. 12, 2006

(54) VACUUM COFFEE MAKER

(75) Inventors: Chi Wah Leung, Hong Kong (HK);
Chi Chung Fung, Hong Kong (HK);
Shek Chuen Luk, Hong Kong (HK)

(73) Assignee: Simatelex Manufactory Co., Ltd., Hong Kong (HK)

(*) Notice: Subject to any disclaimer, the term of this patent is extended or adjusted under 35 U.S.C. 154(b) by 563 days.

(21) Appl. No.: 10/357,989

(22) Filed: Feb. 4, 2003

(65) Prior Publication Data

US 2004/0149138 A1    Aug. 5, 2004

(51) Int. Cl.
*A47J 31/043* (2006.01)

(52) U.S. Cl. .......................................... 99/292; 99/303
(58) Field of Classification Search .................. 99/292, 99/303
See application file for complete search history.

(56) References Cited

U.S. PATENT DOCUMENTS

| | | | | |
|---|---|---|---|---|
| 2,340,203 A | * | 1/1944 | Morse | 99/292 |
| 2,856,844 A | * | 10/1958 | Price | 99/299 |
| 5,025,939 A | * | 6/1991 | Bunn et al. | 215/398 |
| 5,826,493 A | * | 10/1998 | Tien Lin | 99/306 |
| 6,817,280 B1 | * | 11/2004 | Hall et al. | 99/292 |

* cited by examiner

Primary Examiner—Reginald L. Alexander
(74) Attorney, Agent, or Firm—Jackson Walker, LLP

(57) ABSTRACT

A vacuum coffee maker comprises a first vessel for receiving water to be heated and brewed coffee and a second vessel for receiving coffee grounds and brewing coffee therein. The first vessel has an opening in it and a fluid passage from the opening to a lower potion of the vessel. The second vessel having an opening in it. A base for receiving the first vessel is provided with a heater. A platform supports the second vessel above the first vessel. Engagement means releasably brings together the opening in the first vessel and the opening in the second vessel for fluid communication between the first and second vessels.

10 Claims, 5 Drawing Sheets

VACUUM COFFEE MAKER

BACKGROUND TO THE INVENTION

1. Field of the Invention

The invention relates to coffee makers, and in particular to vacuum type coffee makers.

2. Background Information

A conventional vacuum coffee maker comprises a lower vessel in which water is heated by a burner. An upper vessel is mounted on top of the lower vessel with gasket seal between them. A tube extends between the vessels. The heated water in the lower vessel creates a large amount of steam which forces hot water through the tube to the upper vessel. Coffee grounds in the upper vessel come into contact with the hot water. The burner is stopped when all the water in the lower vessel is forced to the upper vessel. A vacuum is formed inside the lower vessel. As air in the lower vessel cools brewed coffee extracts back from the upper vessel to the lower vessel. This principle of coffee brewing is known as vacuum brew.

The vacuum coffee brewing principle results in an extra hot coffee with very good quality in terms of taste and flavour. The coffee grounds are evenly wet and extracted by hot water. However, the vacuum type coffee brewing principle is not as popular as the drip type coffee maker for the domestic market due to its use of a burner and a more complex, not so user friendly, operation. Typically, it is limited to some niche commercial market segments.

The increasing demand for high quality coffee has resulted in improvements to the vacuum coffee maker to try to make it more marketable to the domestic market. Bodium is one of the pioneers in moving from a burner heater to an electric heater. Bodium uses an electric heating element mounted in the bottom of the lower vessel. However, the Bodium unit has not addressed all of the problems of conventional is vacuum coffee makers. The lower vessel is difficult to clean after use as it cannot be placed in a dishwasher due to the electric heater and an electrical control built into the base of the lower vessel. Furthermore, the handling of the upper vessel with integral tube is a tedious job for the user. The upper vessel is very hot just after the brewing process is complete. The user needs to detach this hot upper vessel from the lower vessel with a tightly sealed gasket. A separate stand is required to hold the detached hot upper vessel, which will occupy and waste some countertop space. The consumer needs to spend a lot of effort before enjoying the cup of coffee from the lower vessel.

SUMMARY OF THE INVENTION

It is an object of the present invention to overcome or ameliorate the above-mentioned problem, or at least to provide the public with a useful alternative.

According to a first aspect of the invention there is provided a vacuum coffee maker comprising:

a first vessel for receiving water to be heated and brewed coffee, the first vessel having an opening in it and a fluid passage from the opening to a lower potion of the vessel, a second vessel for receiving coffee grounds and brewing coffee therein, the second vessel having an opening in it, a base for receiving the first vessel, the base being provided with a heater, a platform for supporting the second vessel above the first vessel, and engagement means for releasably bringing together the opening in the first vessel and the opening in the second vessel for fluid communication between the first and second vessels.

Preferably, engagement means comprise a threaded flange positioned with the second vessel and a threaded socket positioned with the platform for receiving the threaded flange.

Preferably, the opening in the upper vessel has a valve that is opened by bringing together the opening in the first vessel and the opening in the second vessel.

Preferably, a gasket is positioned between the opening in the first vessel and the opening in the second vessel.

Preferably, the gasket is positioned about the opening in the first vessel and the opening in the second vessel has a rim with a mating surface for fluid tight engagement with the gasket.

Preferably, the first vessel comprises:

a container having a lower portion for resting on the base and an upper portion with a flared lip for pouring a liquid, a handle, a lid hingeably engaged proximate the handle, a gasket between the lid and the container, and in which the opening is in the lid, and the passage comprises a tube engaged with the lid and extending to the lower portion of the container.

Preferably, the upper portion of the container is plastic or glass, and the lower portion of the container is metal.

Preferably, the opening in the lid has a valve that is opened by bringing together the opening in first vessel and the opening in the second vessel Preferably, the second vessel comprises:

a container defining a chamber for receiving coffee grounds and heated water, the opening being in a wall of the container, a handle, a removable lid, a threaded flange on a bottom portion of the container, a valve in the opening, and which is opened by bringing together the opening in the first vessel and the opening in the second vessel, and a filter positioned between the chamber and the opening.

According to a second aspect of the invention there is provided a vacuum coffee maker comprising:

a lower vessel for receiving water to be heated and brewed coffee, and having a first opening in it and a fluid passage from the first opening to a lower potion of the vessel, an upper vessel for receiving coffee grounds and brewing coffee therein, and having a second opening and a threaded flange, a base with a heater for receiving the lower vessel, a platform provided with a threaded socket for receiving the threaded flange and supporting the upper vessel above the lower vessel, and in which a turning motion of the second vessel brings together the first and second openings for fluid communication between the first and second vessels.

Further aspects of the invention will become apparent from the following description, which is given by way of example only.

BRIEF DESCRIPTION OF THE DRAWINGS

Embodiments of the invention will now be described by way of example only and with reference to the accompanying drawings in which.

DESCRIPTION OF THE PREFERRED EMBODIMENTS

Figure 1:
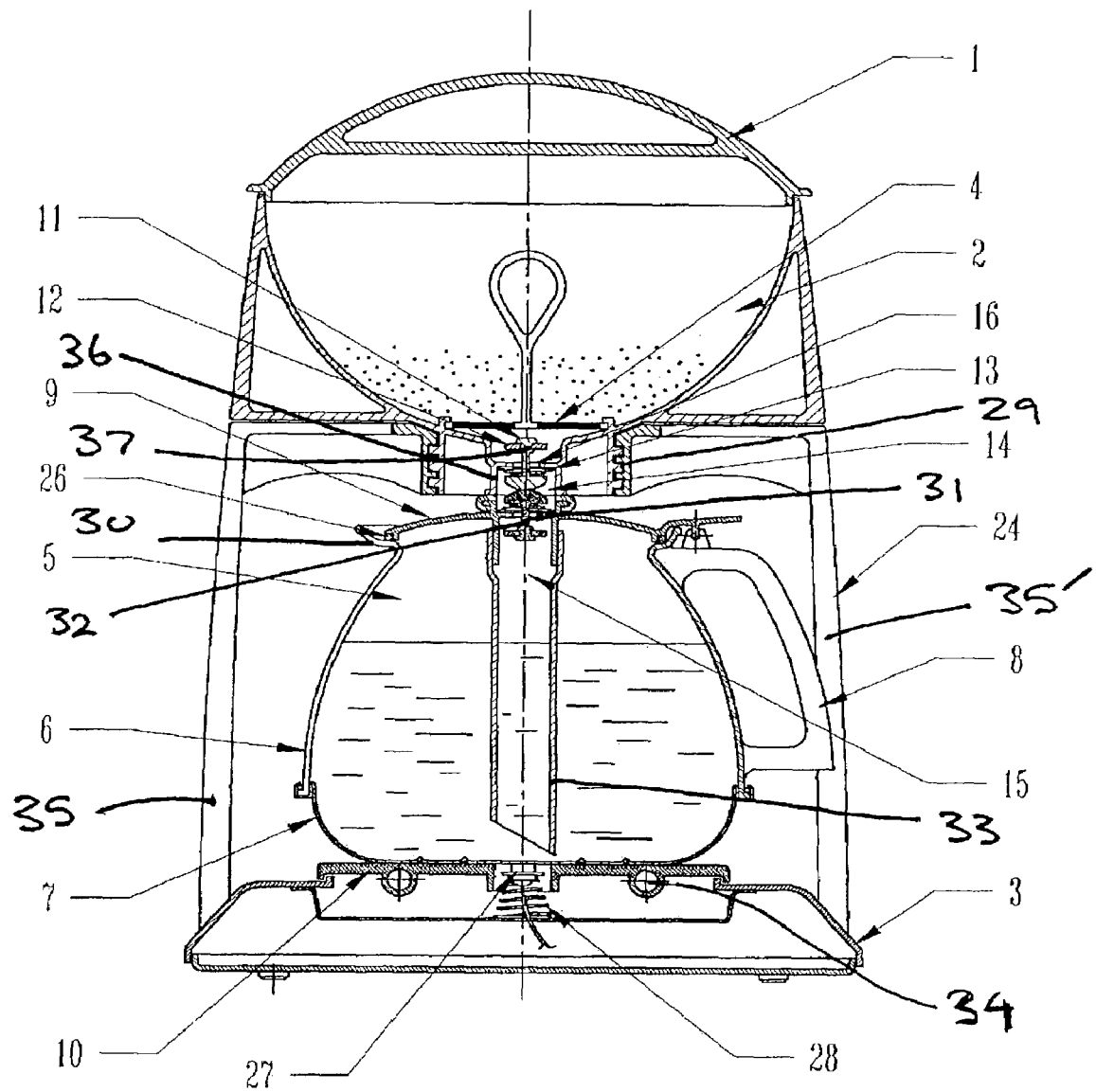
FIG. 1 illustrates a sectional view of a vacuum type coffee maker according to the invention.

Referring to FIG. 1, a vacuum coffee maker according to the invention comprises a first lower vessel or carafe 5 for receiving water to be heated and for brewed coffee, a base 3 with a heater 10 for receiving the carafe 5, a second brewing vessel 2 for receiving coffee grounds and brewing coffee therein and a platform 24 for supporting the brewing vessel 2 above the carafe 5. The carafe 5 communicates with the brewing vessel 2 through an upper water passage 14 with an opening 16 and a lower water passage 15 with an opening 31. The upper passage 14 is, preferably, an integral part of the upper vessel 2, while the lower water passage 15 is, preferably, an integral part of the top cover 9 of the lower vessel 5. The water passages and openings couple at an engagement means in the form of threaded flange and socket joint 29.

A lower vessel 5 comprises an upper plastic or glass body portion 6 with a flared lip 30 for pouring a liquid, a lower metal base portion 7, a handle 8, and a carafe lid 9. In the preferred embodiment the handle 8 is an integral part of the body 6. In alternative embodiments it is a separate part fixed to the body 6 by some known means such as glue or a mechanical band. The carafe lid 9 is hinged or snap-fitted to the handle 8. The carafe lid 9 is sealed against the carafe body 6 with a gasket 26 and forms a closed boiling chamber within carafe 5 for the vacuum brewing process.

The lid 9 of the carafe 5 has an opening 31. Within the opening is a valve 32. The lower passage 15 communicates with opening 31 and comprises a tube 33 engaged with the underside of lid 9 and which extends downwards to just above the bottom of base 7 of carafe 5. On the upper surface of the lid 9 and concentric with opening 31 is a gasket 20.

The carafe 5 sits below support platform 24 on the heating plate 10 of base unit 3. The metal base 7 of carafe 5 is directly touching the heating surface of the heating plate 10. The heating plate 10 is secured on the base 3 with its heating surface exposed upwards and facing the base 7 of the carafe 5. Common known electrical heating methods, such as an electric resistance heating element 34, can be applied to the heater 10. The carafe 5 is free of any electrical components.

The heating plate 10 underneath the carafe 5 has a floating temperature sensing device 27 installed at its center with the sensor surface touching the base 7 of carafe 5. The floating mechanism comprises a biasing spring 28, but may also be a soft rubber gasket or a combination of these. The sensor 27 provides a signal to a control unit for turning off the electric heater element 34 when carafe 5 has boiled dry of water.

The platform 24 comprises support legs 35 extending upwardly from the base 3 to an upper support surface 25 for maintaining the position of the brewing vessel 2 above the carafe 5. Centrally positioned in the upper surface 25 is a threaded socket 22.

The brewing vessel 2 comprises a bowl shaped brewing chamber made of clear plastic with a removable top lid 1. A pair of handles 23 extend downwardly from the rim of the brewing vessel and then inwardly to its lower portion. The profile of the handles 23 matches the legs 35 and upper surface 25 of the platform to give the coffee maker an aesthetic appearance.

A mesh filter 4 is positioned at the bottom of the chamber. A flow opening 16 is present under the filter 4. Concentric with opening 16 is a downwardly extending rim 36 with a mating surface 38 at its lower edge. A valve 37 is located in the opening 16. Coffee grinds are disposed inside the chamber and above the filter 4. A threaded flange 21 extends from a bottom portion of the brewing vessel 2 and is concentric with opening 16.

Figure 2:
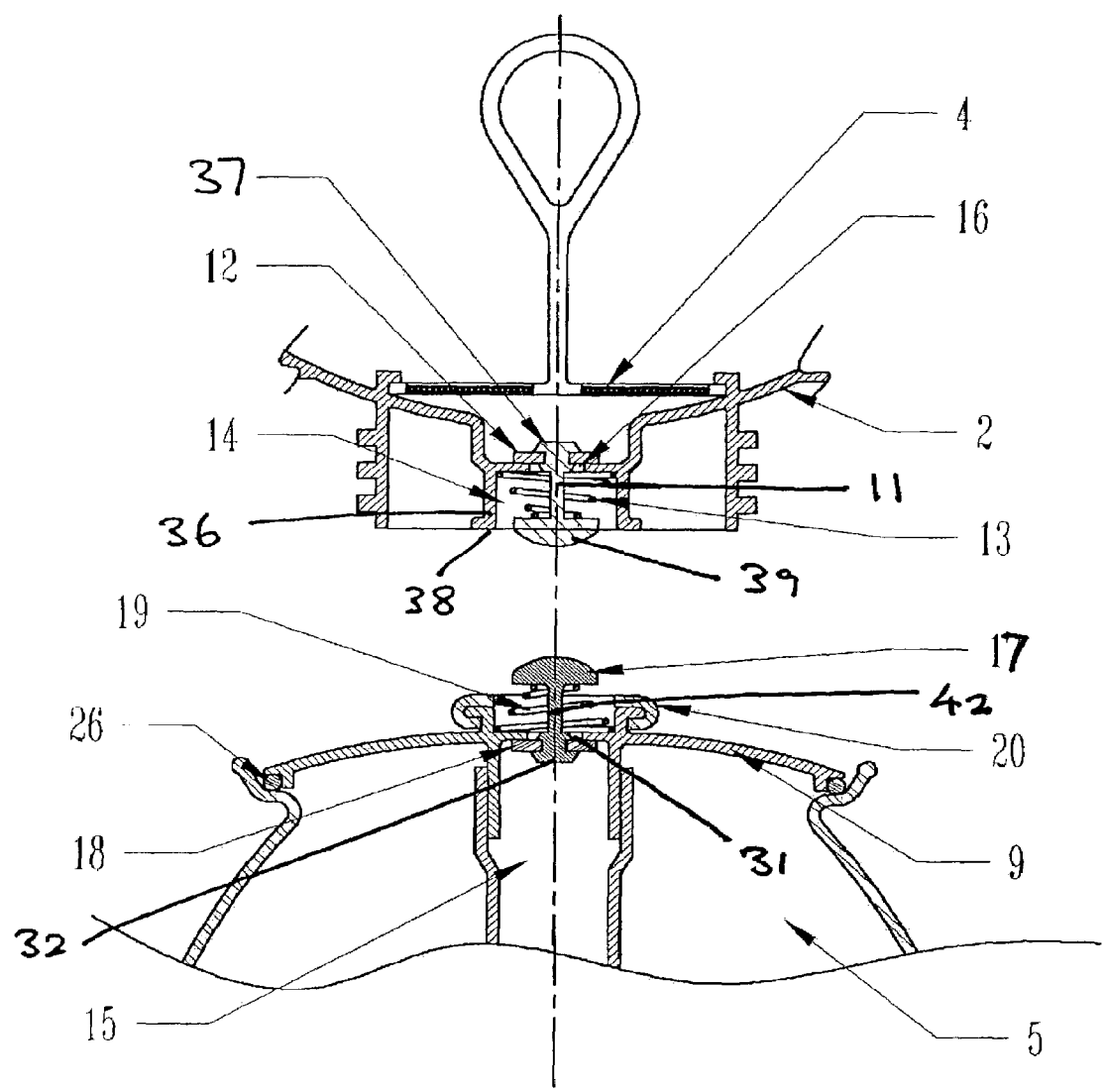
FIGS. 2 and 3 illustrates a detail sectional view of a co-operating valve disposed at the junction between upper and lower vessels.

FIG. 2 shows a detailed cross sectional view of the co-operating valves 32, 37 disposed in the openings 31, 16 of the carafe 5 and brewing vessel 2 respectively. The valves 32, 37 are opened by bringing together the opening 31 in the carafe 5 and the opening 16 in the brewing vessel 2, for fluid communication between the two vessels, and closed when the carafe 5 and brewing vessel 2 are separated.

The valve 37 in the brewing vessel 2 comprises a valve stem 11 passing through opening 16, a valve seat in the form of gasket 12 positioned on the proximal end of the valve stem 11 within the chamber for closing the opening 16 and an actuator in the form of a hemispherical button 39 positioned on the distal end of the stem external the chamber. A biasing spring 13 is positioned about the valve stem 11 between an outer wall of the brewing vessel 2 and the actuator 39. The biasing springs 13 forces the valve seat 11 towards the inner brewing vessel wall sealing opening 16.

The valve 32 in the carafe lid 9 comprises a valve stem 42 passing through opening 31, a valve seat in the form of gasket 18 positioned on the proximal end of the valve stem 42 within the carafe 5 for closing the opening 31 in the lid 9 and an actuator in the form of a hemispherical button 17 positioned on the distal end of the stem 42 external the carafe 5. A biasing spring 19 is positioned about the valve stem 42 between an outer wall of the lid 9 and the actuator 17. The biasing springs 19 forces the valve seat 18 towards the inner lid 9 wall sealing opening 31.

Figure 3:
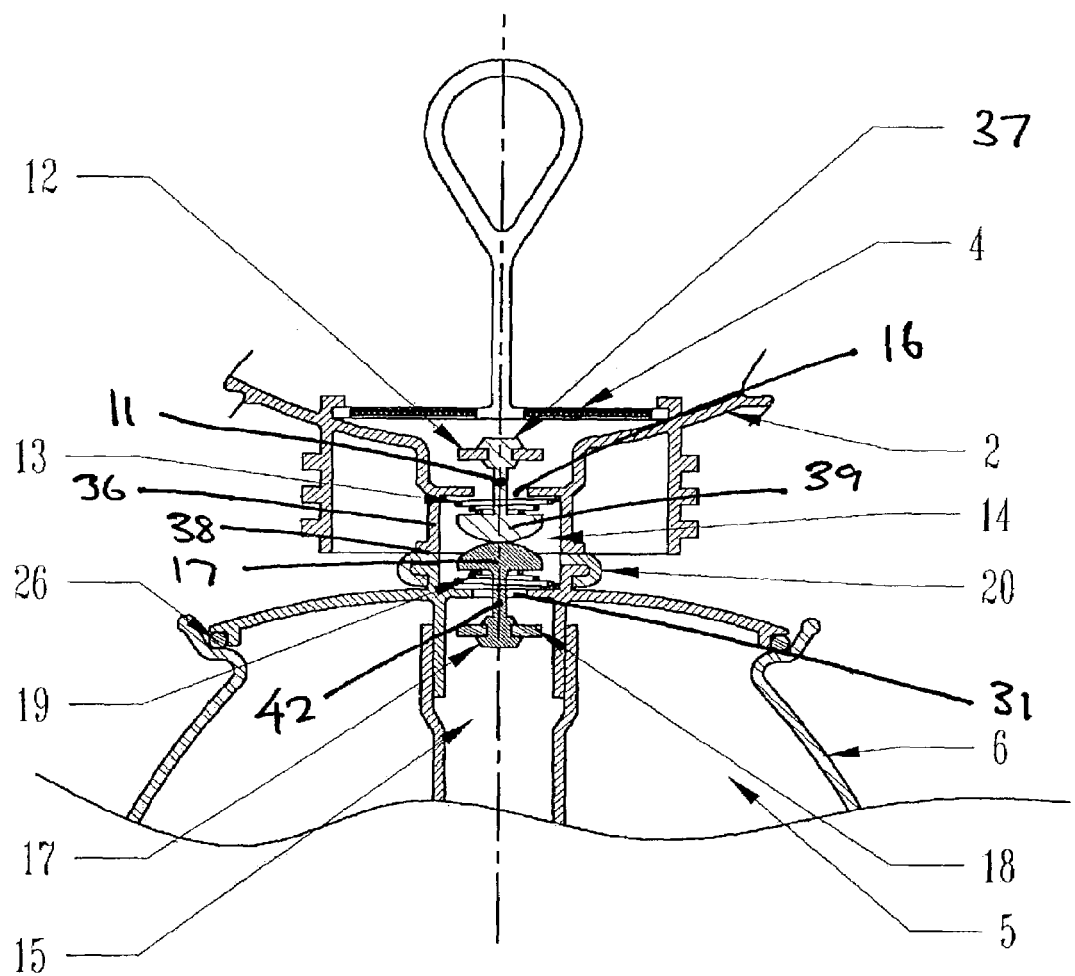

FIG. 3 shows a detailed cross sectional view of the co-operating valve 32, 37 after bringing together the opening 31 in the carafe 5 and the opening 16 in the brewing vessel 2, for fluid communication between the two vessels. The two actuators 17, 39 engage each other compressing the biasing springs 19, 13 and the lifting valve seats 18, 12. The mating surface 38 of the rim 36 forming a fluid tight engagement with the gasket 20 in lid 9. The water passages 14 and 15 connect and form a complete water passage between the brewing vessel 2 and carafe 5.

Figure 4:
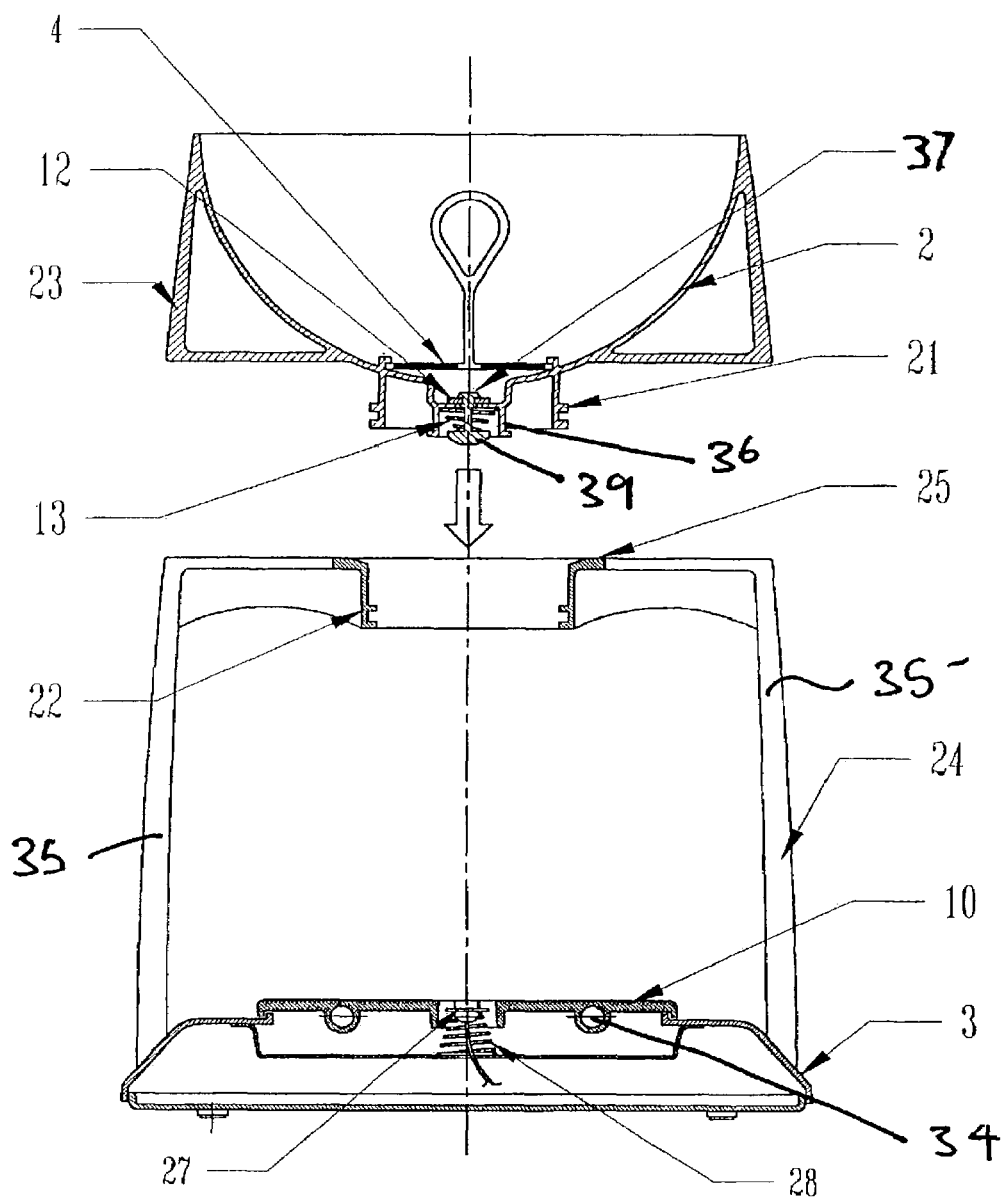
FIGS. 4 and 5 illustrates a detail sectional view of a support platform for the upper vessel.
Figure 5:
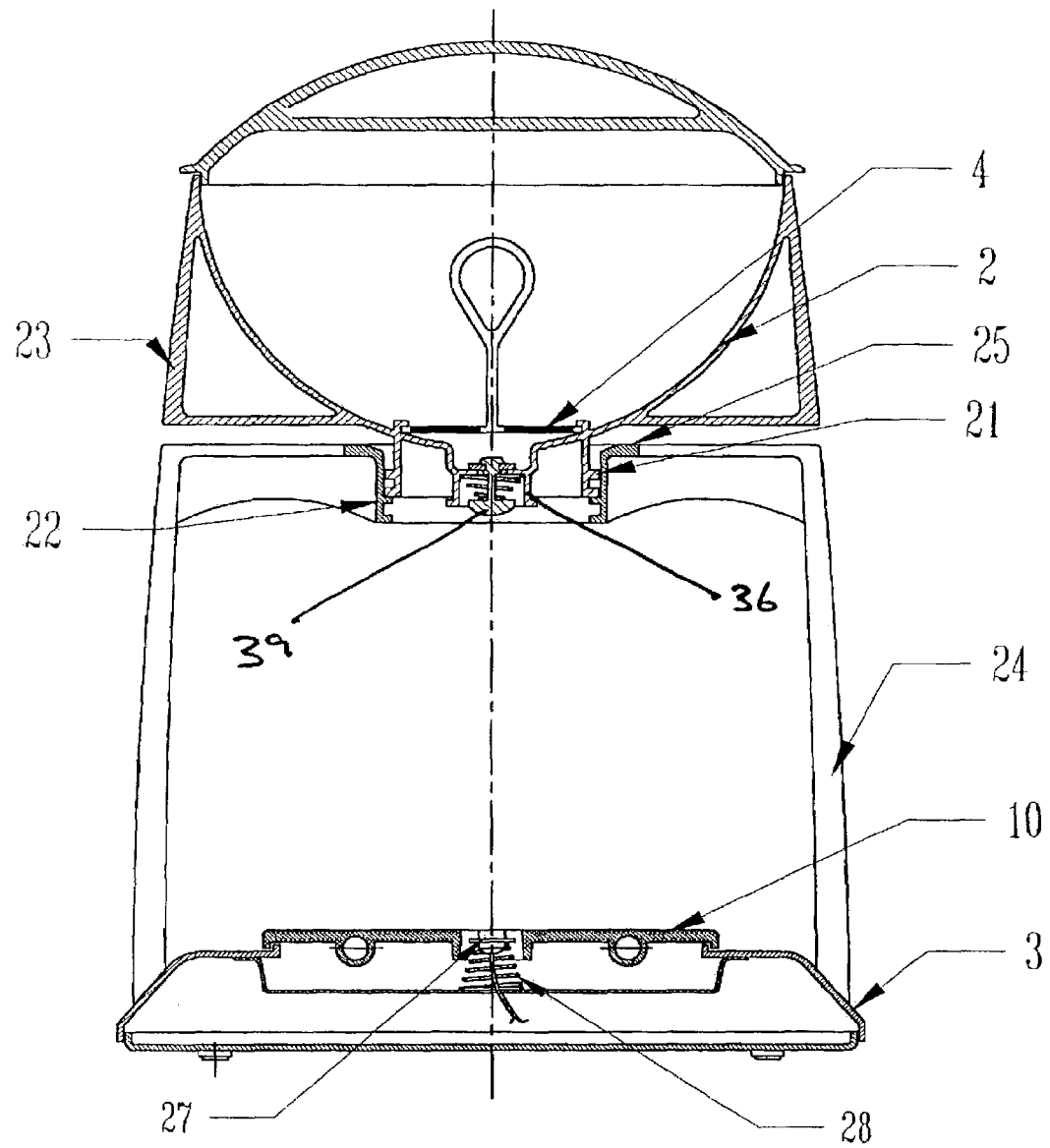

In FIGS. 4 and 5, the engaging mechanism 29 for releasably bringing together the openings in the carafe 5 and the brewing vessel 2 for fluid communication between the first and second vessels. The upper support surface 25 of platform has a threaded socket 22 for receiving the threaded flange 21 of brewing vessel 2. The flange 21 is threaded into socket 22. By a turning motion of the brewing vessel 2 it is moved towards the carafe 5 sitting on base 3 beneath the platform 24 until the two valve actuators 17, 39 engage each other compressing the biasing springs 19, 13 and the lifting valve seats 18, 12. The mating surface 38 of the rim 36 meets gasket 20 on lid 9 and forms a fluid tight seal of the water passage. The water passages 14 and 15 connect and form a complete water passage between the brewing 2 and carafe 5.

Referring to FIG. 4, the brewing vessel 2 can be detached from the support platform 24 after brewing coffee for easy cleaning and placed back on the support platform 25 for next brewing cycle. The upper water passage 14 remains disconnected and thus the valve 37 in flow opening 16 is closed.

Referring to FIG. 5, the brewing vessel 2 sits on the support platform 24 without activating the locking mechanism and maintains its upper position without the involvement of the carafe 5. The brewing vessel 2 is maintained at such a height that allows free movement of the carafe 5 in and out of the heating base 3 without any interference that will trigger the valves 32, 37. Before brewing the brewing vessel 2, the thread 21 on the brewing vessel 2 remains disengaged with the corresponding threaded socket 22 of the support platform 24. Turning the handle 23 of brewing vessel 2 activates the engaged mechanism 29 and causes the thread of flange 21 to engage with the thread of socket 22. The brewing vessel 2 advances slowly towards the carafe 5.

Where in the foregoing description reference has been made to integers or elements having known equivalents then such are included as if individually set forth herein.

Embodiments of the invention have been described, however it is understood that variations, improvements or modifications can take place without departure from the spirit of the invention or scope of the appended claims.

What is claimed is:

1. A vacuum coffee maker comprising:
   a first vessel for receiving water to be heated and brewed coffee, the first vessel having an opening in it and a fluid passage from the opening to a lower portion of the vessel,
   a second vessel for receiving coffee grounds and brewing coffee therein, the second vessel having an opening in it,
   a base for receiving the first vessel, the base being provided with a heater,
   a platform for supporting the second vessel above the first vessel, and
   threaded engagement means for releasably bringing together the opening in the first vessel and the opening in the second vessel for fluid communication between the first and second vessels.

2. The coffee maker of claim 1 in which the threaded engagement means comprise a threaded flange positioned with the second vessel and a threaded socket positioned with the platform for receiving the threaded flange.

3. The coffee maker of claim 1 in which the opening in the upper vessel has a valve that is opened by bringing together the opening in the first vessel and the opening in the second vessel.

4. The coffee maker of claim 1 in which a gasket is positioned between the opening in the first vessel and the opening in the second vessel.

5. The coffee maker of claim 4 in which the gasket is positioned about the opening in the first vessel and the opening in the second vessel has a rim with a mating surface for fluid tight engagement with the gasket.

6. The coffee maker of claim 1 in which the first vessel comprises:
   a container having a lower portion for resting on the base and an upper portion with a flared lip for pouring a liquid,
   a handle,
   a lid hingeably engaged proximate the handle,
   a gasket between the lid and the container,
   and in which the opening is in the lid, and the passage comprises a tube engaged with the lid and extending to the lower portion of the container.

7. The coffee maker of claim 6 in which the upper portion of the container is plastic or glass, and the lower portion of the container is metal.

8. The coffee maker of claim 6 in which the opening in the lid has a valve that is opened by bringing together the opening in first vessel and the opening in the second vessel.

9. The coffee maker of claim 1 in which the second vessel comprises:
   a container defining a chamber for receiving coffee grounds an heated water, the opening being in a wall of the container,
   a handle,
   a removable lid,
   a threaded flange on a bottom portion of the container,
   a valve in the opening, and which is opened by bringing together the opening in the first vessel and the opening in the second vessel, and
   a filter positioned between the chamber and the opening.

10. A vacuum coffee maker comprising:
    a lower vessel for receiving water to be heated and brewed coffee, and having a first opening in it and a fluid passage from the first opening to a lower portion of the vessel,
    an upper vessel for receiving coffee grounds and brewing coffee therein, and having a second opening and a threaded flange,
    a base with a heater for receiving the lower vessel,
    a platform provided with a threaded socket for receiving the threaded flange and supporting the upper vessel above the lower vessel,
    and in which a turning motion of the second vessel brings together the first and second openings for fluid communication between the first and second vessels.

* * * * *